United States Patent

[11] 3,593,048

| [72] | Inventors | Harold L. Dunegan<br>868 Leland Way, Livermore, Calif. 94550;<br>Albert E. Brown, 28242 Beaton Way,<br>Hayward, Calif. 94544; Paul L. Knauss,<br>1138 Aberdeen St., Livermore, Calif.<br>94550 |
|---|---|---|
| [21] | Appl. No. | 882,205 |
| [22] | Filed | Dec. 4, 1969 |
| [45] | Patented | July 13, 1971 |

[54] DIFFERENTIAL TRANSDUCER
5 Claims, 4 Drawing Figs.

[52] U.S. Cl. ................................................. 310/8.1,
73/71.4, 310/8.7
[51] Int. Cl. ................................................. H01v 7/00
[50] Field of Search ................................. 310/8, 7, 8.8,
8.5, 8.4, 8.1, 8.6, 8.2, 8.3, 9.5, 9.6; 73/71.4, 133

[56] References Cited
UNITED STATES PATENTS

| 3,402,306 | 9/1968 | Cary et al. | 310/8.7 |
| 3,311,873 | 3/1967 | Schloss | 310/8.4 X |
| 3,336,807 | 8/1967 | VanLint et al. | 310/8.7 X |
| 3,024,429 | 3/1962 | Cavalieri et al. | 331/156 X |
| 3,269,175 | 8/1966 | Sprosty | 310/8.7 X |
| 3,150,275 | 9/1964 | Lucy | 310/8.5 X |
| 3,396,286 | 8/1968 | Anderson et al. | 310/8.1 X |

Primary Examiner—Milton O. Hirshfield
Assistant Examiner—B. A. Reynolds
Attorney—Gregg and Hendricson ABSTRACT: A transducer such as piezoelectric crystal is halved and, with one half inverted, the parts are joined together with insulation therebetween. An electrical connection is made between faces of the two halves on one side of the unit and electrical conductors extend separately from the two halves on the other side of the unit to a differential amplifier. Ambient electrical fields do not influence the output of the transducer.

INVENTORS
HAROLD L. DUNEGAN
ALBERT E. BROWN
PAUL L. KNAUSS

BY Gregg & Henderson
ATTORNEYS

DIFFERENTIAL TRANSDUCER

BACKGROUND OF INVENTION

A wide variety of different types of transducers have been developed and in this field are to be found devices for transducing stress into electrical potentials or signals. Piezoelectric crystals are employed for this use and a wide variety of different crystal configurations and apparatus have been developed both for this and other uses of these types of transducers. It is recognized that piezoelectric crystals may also be oppositely employed, i.e. to deflect upon the application of electrical potentials.

In brief, the change in stress applied to a piezoelectric crystal causes a potential to be generated between opposite faces thereof. In the measurement of stress this effect is commonly employed by the attachment of such a crystal to an element to be monitored for stress and the connection of electrical conductors to opposite faces of the crystal so that the generated potential may be amplified and indicated as a measurement of stress.

One of the difficulties encountered in the above-noted type of stress measurement is the source of error that may be introduced by induction of voltages between electrodes of the crystal by virtue of ambient electric fields. Many applications of transducers require their location in positions where transient fields occur and it is readily recognized that such fields readily induce a voltage between the crystal conductors. This then provides some type of output voltage superimposed upon the crystal voltage to vary or even mask the desired output from the crystal. The present invention provides a very simple solution to this problem by inversion of a crystal half together with appropriate electrical circuitry to cancel out induced voltages while retaining crystal generated output voltages.

SUMMARY OF INVENTION

There is provided by this invention a simple differential transducer best described in terms of a simple piezoelectric crystal. Instead of a single crystal element, the present invention provides a pair of crystal elements preferably formed by halving a single crystal unit. The two halves are joined together with insulation therebetween with one half inverted with respect to the other so that what may be generally termed a positive polarity face of a crystal half is disposed adjacent a negative polarity face of the other crystal half.

The unit briefly described above is completed by the application of an electrical conductor extending between the halves of one side of the unit and electrical conductors extending from the two halves of the other side on the opposite face of the unit. These electrical conductors are extended to a differential amplifier, preferably through a shielded conductor with the shield connected to the opposite side of the transducer. Transient electrical fields induce like voltages in each of the aforementioned conductors and thus the differential amplifier or preamplifier is not affected by such induced voltages for it is the difference voltage which is amplified.

In the foregoing simple but highly effective manner, the present invention provides for eliminating effects of transient electrical fields in the vicinity of the transducer.

DESCRIPTION OF FIGURES

A preferred embodiment of the present invention is illustrated in the accompanying drawing wherein.

DESCRIPTION OF PREFERRED EMBODIMENT

The present invention employs piezoelectric crystals to form a transducer for measuring various effects particularly in the field of materials testing. One application of transducers is found in the detection of acoustic emission from materials under stress. One of the first researchers in this field was J. Kaiser (German Pat. No. 842,771) who identified an irreversible effect known as the Kaiser effect. Although acoustic emission has long been known and has been employed in connection with materials testing, it has commonly been limited to laboratory experiments, at least in part because of the difficulty encountered from mechanical and electrical background noise. In order, however, to apply acoustic emission detection to nondestructive testing and materials studies outside of the laboratory, it is necessary for measurements to be made in the presence of low frequency noise and radio frequency electrical transients. Various developments have proven effective in eliminating low frequency mechanical background noise but these have not proven successful in eliminating the noise of electrical transients caused by relays, motor brushes, arc welding equipment and the like, near the test area. The present invention is particularly applicable to the elimination of noise signals caused by electrical transients and thus the following description of a preferred embodiment of this invention is referenced to this application.

Figure 1:
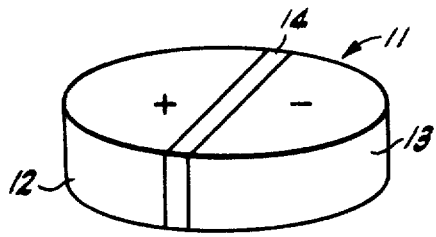
FIG. 1 is an enlarged perspective view of a differential transducer crystal in accordance with the present invention.
Figure 2:
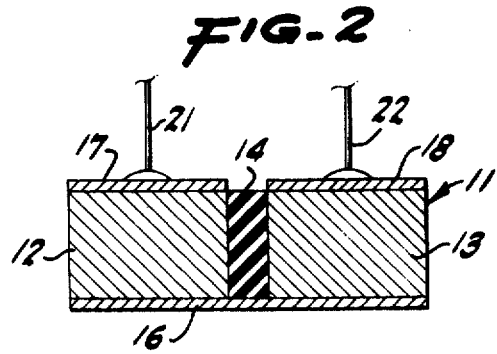
FIG. 2 is a central sectional view of the transducer of this invention including electrodes.

Referring now to FIGS. 1 and 2 of the drawing, there will be seen to be shown a piezoelectric crystal 11 in the form of a shortened cylinder. This crystal is illustrated to be formed of two halves 12 and 13 which in practice are preferably obtained by cutting a single piezoelectric crystal in half longitudinally of the cylindrical configuration illustrated. One of the two halves 13 is then rotated 180° and is joined to the other half by an insulating layer 14. A properly cut piezoelectric crystal will have one face thereof with a polarity opposite to the other face and these may be conveniently denominated as plus and minus polarities. Thus the application of a stress to the crystal will cause a relatively positive voltage to be generated at one face thereof with a relatively negative voltage generated at the opposite face. In the present invention the crystal is halved and one half inverted so that the upper face of the crystal illustrated in FIG. 1 will have a plus polarity surface adjacent a negative polarity surface, again as indicated by the plus or minus signs in the Figure.

Although the foregoing description assumes a single piezoelectric crystal as being divided in half with one half inverted, it is possible for the transducer to be formed of two separate crystals. In this case the two like crystals are oppositely oriented with opposite polarity surfaces forming each flat face of the unit. A structure formed of two different crystals has the possible disadvantage of dissimilarities between the transducer halves. Thus it is preferable to employ but a single crystal and also care should be taken that the crystal is evenly divided so that each half thereof is indeed one half of the transducer.

The structure of FIGS. 1 and 2 further includes an electrically conducting layer 16 applied to a front face of the unit and extending across the insulating layer 14 so as to form electrical contact with both halves 12 and 13 of the crystal. The two halves 12 and 13 of the transducer are provided upon the upper face of the latter with electrodes 17 and 18 respectively, which may be comprised as conducting epoxy layers or silver plating, for example. Conductors 21 and 22 are attached to the electrodes 17 and 18 respectively.

The transducer structure, as described above and illustrated in FIGS. 1 and 2, is adapted to be stressed as, for example, by the application of acoustic emissions so as to generate a potential difference between opposite faces thereof. With the configuration illustrated and described, it will be seen that the polarity of voltage generated on the upper face of the two crystal halves 12 and 13 by an applied stress will be of opposite polarity. The present invention operates to amplify the difference voltage appearing between the electrodes 17 and 18 and thus between output conductors 21 and 22 and to employ same as an indication of the stress applied to the crystal. Considering this point further, it is noted that a transient electrical field encompassing the transducer will induce a like voltage in opposite sides of the transducer and the electrodes thereof, and that consequently the voltage of each electrode will be varied a like amount. This, however, has no effect upon the difference voltage existing between the electrodes of the two halves, and consequently, the present invention is thus adapted for utilization in areas of transient electrical fields without such fields adversely affecting the output of the transducer.

Figure 3:
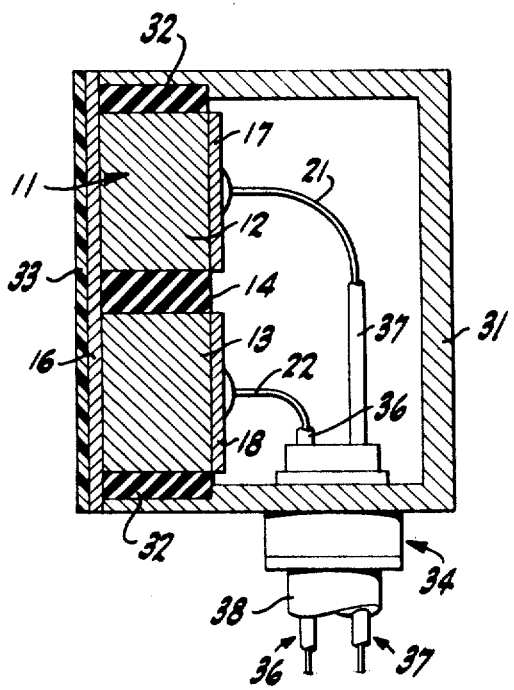
FIG. 3 is a side elevational view of a differential transducer unit with the housing broken away to illustrate mounting and electrical connections.

The differential transducer of the present invention may be embodied in a variety of different physical configurations and in this respect reference is made to FIG. 3 illustrating one possible practical embodiment of the invention. The piezoelectric crystal 11 incorporating inverted halves 12 and 13 is shown in FIG. 3 to be mounted in a small cylindrical cup-shaped housing 31 formed of an electrically conducting material such as metal. One end of the housing 31 is open and an internal shoulder is formed thereabout for mounting of the crystal 11. An insulator 32 is secured about the periphery of the crystal and rests upon the internal shoulder of the housing 31 to thereby mount the crystal within the housing. The electrode or conducting layer 16 across the front face of the transducer 11 is extended to contact the housing 31 about the open end thereof as shown in FIG. 3 and this layer may, for example, be formed of a conducting epoxy. Over the layer 16 there may be provided an outer layer 33, sometimes termed a "shoe", in the form of an epoxy material. This outer layer 33 electrically insulates the system from the structure upon which the transducer is adapted to be connected for receiving acoustic emission to thereby provide a "floating" system. It will be seen that with this mounting the transducer 11 is electrically insulated from the housing 31 except by means of the front face electrode 16.

Electrical connection to the back face of the transducer is provided in the illustrated embodiment by a shielded two-wire line 34 which may extend through the housing 31 with the transducer conductors 21 and 22 engaging or, in fact, comprising the two conductors 36 and 37 of the two-wire line. A shield 38 of the line physically and electrically engages the housing 31 to thus electrically connect to the front face electrode 16 of the transducer. This then provides for shielding of the conductors 36 and 37 of the line extending from the transducer assembly.

Figure 4:
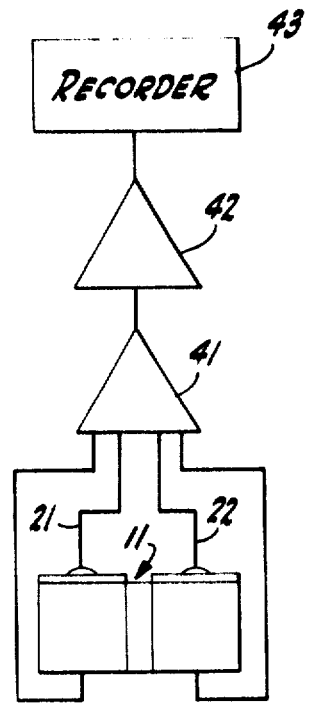
FIG. 4 is a circuit diagram of a differential transducer system.

The differential transducer assembly or system incorporates electrical circuitry for operation upon signals generated by the transducer itself. This is generally illustrated in FIG. 4 wherein the transducer 11 is shown as having the electrical conductors 21 and 22 extending from opposite halves of the crystal to a differential preamplifier 41. It will be appreciated that in actuality the leads or conductors 21 and 22 electrically merge with the conductors 36 and 37 of the shielded line 34 with the shield 38 thereof thus also extending to the differential preamplifier. This differential amplifier 41 operates to amplify the difference in voltage between the lines 21 and 22 and thus the difference voltage existing between the two sides of the back face of the crystal. Consequently electrical potentials induced in the crystal and connections thereto are cancelled out, for substantially the same potential would be induced in each half of the crystal and electrodes thereof so that the difference in potential between the two halves is not varied by the induced voltage. The output of the differential preamplifier 41, which is now single ended, is fed to an amplifier 42 that in turn operates some type of recorder or indicating means 43. The electrical system of the differential transducer hereof incorporates a differential amplifier or preamplifier, in distinction to conventional transducer circuitry inasmuch as it is the difference in potential between the two output leads 21 and 22 of the transducer that is of interest herein. The generation of a differential output by the transducer and the amplification of same by a differential amplifier is materially different from normal and conventional transducer structures and circuitry. There may, however, be employed a conventional amplifier and recorder, 42 and 43 respectively, operated by the output of the differential preamplifier 41.

The present invention will be seen to provide certain capabilities in connection with utilization of transducers in the vicinity of transient electrical fields. The problem of interference with transducer output by such transient fields as may be generated by welding equipment, electrical motors or the like, is substantially entirely precluded by the present invention. It is, of course, possible to vary the present invention from the illustrated embodiment thereof and above description of same. Thus, for example, the circular or cylindrical configuration of the crystal of the transducer is by no means limiting and, of course, the transducer mounting and housing as well as electrical connections may be varied within the limitations of good engineering practice. Although the present invention has been described and illustrated in connection with a single preferred embodiment thereof, it is to be appreciated that the invention is not to be limited to the details of illustration or terminology of description.

We claim:

1. A differential transducer comprising a piezoelectric crystal unit including two crystal pieces separated by insulation with one piece inverted with respect to the other to dispose a positive polarity surface of one piece in alignment with a negative polarity surface of the other piece as a front face of the unit, a common electrical conductor connecting the two pieces at said front face of the unit, and a pair of electrical conductors separately connected one to each crystal piece at a back face of said crystal unit.

2. The differential transducer of claim 1 further defined by said crystal pieces comprising separate halves of a single piezoelectric crystal, and said crystal unit comprising the two halves disposed in side-by-side relation with insulation therebetween.

3. The differential transducer of claim 1 further defined by said piezoelectric crystal unit comprising two halves of a single crystal having flat front and back surfaces and one half being inverted to dispose the back surface thereof in alignment beside the front surface of the other half of the crystal unit as a back face of the crystal unit, said insulation joining together said crystal halves, and said common conductor comprising an electrically conducting layer extending across the front face of the crystal unit in electrical contact with both crystal halves.

4. A differential transducer comprising a piezoelectric crystal unit including two crystal pieces separated by insulation with one piece inverted with respect to the other to dispose a positive polarity surface of one piece in alignment with a negative polarity surface of the other piece as a front face of the unit, a common electrical conductor connecting the two pieces at said front face of the unit, a pair of electrical conductors separately connected one to each crystal piece at a back face of said crystal unit, a differential amplifier having a pair of inputs, connecting means connecting said pair of conductors to said inputs, and indicating means connected to the output of said amplifier.

5. The differential transducer of claim 4 further defined by said connecting means comprising a shielded two-wire line having the shield thereof extending between said common conductor and said amplifier and two wires thereof connecting said pair of conductors and said amplifier input.